(12) United States Patent
Holmes, IV et al.

(10) Patent No.: US 8,511,691 B2
(45) Date of Patent: Aug. 20, 2013

(54) SIMPLIFIED LOW INSERTION FORCE SEALING DEVICE CAPABLE OF SELF RESTRAINT AND JOINT DEFLECTION

(75) Inventors: William W. Holmes, IV, Hoover, AL (US); William H. Owen, Fultondale, AL (US)

(73) Assignee: Mueller International, LLP, Atlanta, GA (US)

( * ) Notice: Subject to any disclaimer, the term of this patent is extended or adjusted under 35 U.S.C. 154(b) by 0 days.

(21) Appl. No.: 13/475,353

(22) Filed: May 18, 2012

(65) Prior Publication Data

US 2012/0228836 A1      Sep. 13, 2012

Related U.S. Application Data

(62) Division of application No. 13/113,684, filed on May 23, 2011.

(60) Provisional application No. 61/347,612, filed on May 24, 2010.

(51) Int. Cl.
*F16L 17/00* (2006.01)
*F16J 15/02* (2006.01)

(52) U.S. Cl.
USPC .......................... 277/616; 277/626; 277/644

(58) Field of Classification Search
USPC ................. 277/616, 644, 626–627; 285/374
See application file for complete search history.

(56) References Cited

U.S. PATENT DOCUMENTS

| | | | |
|---|---|---|---|
| 784,400 | A | 3/1905 | Howe |
| 1,818,493 | A | 8/1931 | McWane |
| 2,032,492 | A | 3/1936 | Nathan |
| 2,201,372 | A | 5/1940 | Miller |

(Continued)

FOREIGN PATENT DOCUMENTS

| | | |
|---|---|---|
| GB | 2161233 | 1/1986 |
| JP | 5311271 | 2/1978 |
| JP | 5312517 | 2/1978 |
| WO | 2011043836 | 4/2011 |

OTHER PUBLICATIONS

Holmes IV, William W., Patent Application Entitled: Simplified Low Insertion Force Sealing Device Capable of Self Restraint and Joint Deflection; U.S. Appl. No. 12/711,050, filed Feb. 23, 2010; 31 pgs.

(Continued)

*Primary Examiner* — Vishal Patel
(74) *Attorney, Agent, or Firm* — Taylor English Duma LLP

(57) ABSTRACT

A conduit coupling system, sealing device, bell and method of use are disclosed herein. The system comprises at least two piping components, and a sealing device. A first component has a bell and a second component has a spigot, the spigot is adapted to mate with the bell. The bell comprises a first end and a second end, the first end coupled to the first component. The bell has a concave annular inner surface and a diameter of the annular inner surface adjacent to the first end of the bell is greater than a diameter of the annular inner surface adjacent to the second end of the bell. The sealing device comprises a locking segment comprising a convex outer surface and a K-type gasket coupled to a locking segment or a non-restraining anti-extrusion segment. The sealing device is adapted to fit between the bell and the spigot.

8 Claims, 9 Drawing Sheets

(56) References Cited

U.S. PATENT DOCUMENTS

| | | | |
|---|---|---|---|
| 2,398,399 A | 4/1946 | Alexander | |
| 2,647,002 A * | 7/1953 | Brummer | 277/574 |
| 2,953,398 A | 9/1960 | Huagen et al. | |
| 3,048,415 A | 8/1962 | Shook | |
| 3,078,332 A | 2/1963 | Marx | |
| 3,306,622 A * | 2/1967 | Liebig | 277/575 |
| 3,331,611 A * | 7/1967 | Liebig | 277/546 |
| 3,445,120 A | 5/1969 | Barr | |
| 3,815,940 A | 6/1974 | Luckenbill | |
| 3,857,589 A * | 12/1974 | Oostenbrink | 277/615 |
| 3,899,183 A | 8/1975 | Wild et al. | |
| 3,963,298 A | 6/1976 | Seiler | |
| 4,034,994 A | 7/1977 | Ohta et al. | |
| 4,040,651 A | 8/1977 | LaBranche | |
| 4,229,026 A | 10/1980 | Seiler | |
| 4,299,412 A | 11/1981 | Parmann | |
| 4,643,466 A | 2/1987 | Conner et al. | |
| 4,664,426 A | 5/1987 | Ueki | |
| 4,834,398 A | 5/1989 | Guzowski et al. | |
| 4,916,799 A | 4/1990 | Skinner et al. | |
| 4,991,858 A * | 2/1991 | Abila et al. | 277/606 |
| 5,067,751 A | 11/1991 | Walworth et al. | |
| 5,197,768 A | 3/1993 | Conner | |
| 5,269,569 A | 11/1993 | Weber et al. | |
| 5,295,697 A | 3/1994 | Weber et al. | |
| 5,297,824 A | 3/1994 | Imhof et al. | |
| 5,297,826 A | 3/1994 | Percebois et al. | |
| 5,303,935 A * | 4/1994 | Saksun | 277/567 |
| 5,316,352 A | 5/1994 | Smith | |
| 5,335,946 A | 8/1994 | Dent et al. | |
| 5,360,218 A | 11/1994 | Percebois et al. | |
| 5,393,107 A | 2/1995 | Vobeck | |
| 5,464,228 A | 11/1995 | Weber et al. | |
| 5,520,419 A | 5/1996 | DeBoalt et al. | |
| 5,580,068 A | 12/1996 | Gundy | |
| 5,779,285 A | 7/1998 | Robison | |
| 5,853,655 A | 12/1998 | Baker | |
| 5,988,695 A | 11/1999 | Corbett | |
| 6,062,611 A | 5/2000 | Percebois et al. | |
| 6,142,484 A | 11/2000 | Valls | |
| 6,152,494 A | 11/2000 | Corbett et al. | |
| 6,220,635 B1 | 4/2001 | Vitel et al. | |
| 6,299,176 B1 | 10/2001 | Guzowski et al. | |
| 6,457,718 B1 | 10/2002 | Quesada | |
| 6,488,319 B2 | 12/2002 | Jones | |
| 6,488,583 B1 | 12/2002 | Jones et al. | |
| 6,499,744 B1 | 12/2002 | Quesada | |
| 6,502,867 B2 | 1/2003 | Holmes et al. | |
| 6,550,500 B2 | 4/2003 | Jarvenkyla et al. | |
| 6,688,652 B2 | 2/2004 | Holmes et al. | |
| 6,945,570 B2 | 9/2005 | Jones | |
| 6,947,443 B1 | 9/2005 | Corbett | |
| 6,974,160 B2 | 12/2005 | Jones | |
| D514,671 S | 2/2006 | Jones | |
| 7,093,863 B2 | 8/2006 | Holmes | |
| 7,104,573 B2 | 9/2006 | Copeland | |
| 7,108,289 B1 | 9/2006 | Holmes | |
| 7,125,054 B2 | 10/2006 | Jones | |
| 7,134,204 B2 | 11/2006 | Corbett et al. | |
| 7,137,653 B2 | 11/2006 | Copeland | |
| 7,140,618 B2 | 11/2006 | Valls, Jr. | |
| 7,207,606 B2 | 4/2007 | Owens et al. | |
| D553,716 S | 10/2007 | Lockard | |
| 7,284,310 B2 | 10/2007 | Jones et al. | |
| D556,866 S | 12/2007 | Darce | |
| D556,867 S | 12/2007 | Darce | |
| D557,386 S | 12/2007 | Darce | |
| D557,387 S | 12/2007 | Darce | |
| D557,771 S | 12/2007 | Darce | |
| D558,310 S | 12/2007 | Quesada | |
| 7,310,867 B2 | 12/2007 | Corbett | |
| D559,363 S | 1/2008 | Darce | |
| 7,328,493 B2 | 2/2008 | Jones et al. | |
| 7,354,073 B2 | 4/2008 | Sakamoto | |
| 7,392,989 B2 | 7/2008 | Corbett | |
| 7,401,819 B2 | 7/2008 | Gibb et al. | |
| 7,404,872 B2 | 7/2008 | Fisher | |
| D574,934 S | 8/2008 | Darce et al. | |
| 7,410,174 B2 | 8/2008 | Jones et al. | |
| 7,441,319 B2 | 10/2008 | Corbett et al. | |
| 7,509,724 B2 | 3/2009 | Corbett et al. | |
| 7,513,536 B2 | 4/2009 | Corbett et al. | |
| 7,537,248 B2 | 5/2009 | Jones et al. | |
| 7,618,071 B2 | 11/2009 | Jones et al. | |
| 7,789,431 B2 | 9/2010 | Freudendahl | |
| 8,096,585 B2 | 1/2012 | Vitel et al. | |
| 2002/0017789 A1 | 2/2002 | Holmes | |
| 2004/0130103 A1 | 7/2004 | Corbett | |
| 2004/0140625 A1 | 7/2004 | Valls, Jr. | |
| 2004/0150170 A1 | 8/2004 | Shaffer et al. | |
| 2004/0232627 A1 | 11/2004 | Corbett | |
| 2004/0234776 A1 | 11/2004 | Corbett | |
| 2005/0046189 A1 | 3/2005 | Corbett et al. | |
| 2007/0063516 A1 | 3/2007 | Jones et al. | |
| 2007/0200005 A1 | 8/2007 | Corbett et al. | |
| 2007/0210528 A1 * | 9/2007 | Baber | 277/549 |
| 2008/0001401 A1 | 1/2008 | Quesada et al. | |
| 2008/0007057 A1 | 1/2008 | Schmuck et al. | |
| 2008/0007062 A1 | 1/2008 | Jones et al. | |
| 2008/0012239 A1 | 1/2008 | Corbett et al. | |
| 2008/0018017 A1 | 1/2008 | Quesada | |
| 2008/0018057 A1 | 1/2008 | Gibb et al. | |
| 2008/0111319 A1 * | 5/2008 | Nowack et al. | 277/616 |
| 2008/0157524 A1 | 7/2008 | Jones et al. | |
| 2008/0272595 A1 | 11/2008 | Gibb et al. | |
| 2008/0277884 A1 | 11/2008 | Corbett et al. | |
| 2008/0284166 A1 | 11/2008 | Darce et al. | |
| 2008/0290652 A1 | 11/2008 | Gibb et al. | |
| 2008/0303220 A1 | 12/2008 | Darce et al. | |
| 2009/0060635 A1 * | 3/2009 | Jones et al. | 403/14 |
| 2009/0152863 A1 | 6/2009 | Steinbruck | |
| 2009/0200705 A1 | 8/2009 | Mora | |
| 2009/0273184 A1 | 11/2009 | Wright et al. | |
| 2010/0045029 A1 | 2/2010 | Youssef et al. | |
| 2010/0078937 A1 | 4/2010 | Jones et al. | |
| 2010/0090460 A1 | 4/2010 | Vitel et al. | |
| 2011/0024995 A1 | 2/2011 | Schaefer et al. | |
| 2011/0266752 A1 | 11/2011 | Kocurek et al. | |
| 2012/0038116 A1 | 2/2012 | Holmes, IV | |
| 2012/0049463 A1 | 3/2012 | Holmes, IV | |

OTHER PUBLICATIONS

Holmes, IV, William W.; U.S. Provisional Patent Application Entitled: Gasket for Parabolic Ramp Self Restraining Bell Joint under U.S. Appl. No. 61/376,450, filed Aug. 24, 2010, 45 pgs.

Holmes IV, William W., Restriction Requirement for U.S. Appl. No. 12/711,050, filed Feb. 23, 2010; mailed Mar. 17, 2011; 6 pages.

Holmes IV, William W., Patent Application Entitled: Simplified Low Insertion Force Sealing Device Capable of Self Restraint and Joint Deflection; U.S. Appl. No. 13/103,126, filed May 9, 2011; 28 pgs.

Holmes, IV William W.; PCT Application Entitled: Simplified Low Insertion Force Sealing Device Capable of Self Restraint and Joint Deflection, under application No. PCT/US11/37565, filed May 23, 2011; 29 pgs.

Holmes, IV, William W.; U.S. Patent Application Entitled: Simplified Low Insertion Force Sealing Device Capable of Self Restraining and Joint Deflection under U.S. Appl. No. 13/113,684, filed May 23, 2011, 29 pgs.

Holmes, IV, William W.; U.S. Patent Application Entitled: Gasket for Parabolic Ramp Self Restraining Bell Joint under U.S. Appl. No. 13/216,523, filed Aug. 24, 2011, 34 pgs.

Holmes, IV, William W.; PCT Patent Application Entitled: Gasket for Parabolic Ramp Self Restraining Bell Joint under application No. PCT/US11/48953, filed Aug. 24, 2011, 48 pgs.

Holmes, IV William W.; PCT Search Report for application No. PCT/US11/37565; filed May 23, 2011; mailed Sep. 8, 2011; 9 pages.

Holmes IV, William W., Restriction Requirement for U.S. Appl. No. 12/711,050, filed Feb. 23, 2010; mailed Sep. 15, 2011; 7 pages.

Holmes IV, William W., Patent Application Entitled: Simplified Low Insertion Force Sealing Device Capable of Self Restraint and Joint Deflection; U.S. Appl. No. 13/284,915, filed Oct. 30, 2011; 27 pgs.

Holmes IV, William W., Non-Final Office Action for U.S. Appl. No. 12/711,050, filed Feb. 23, 2010; mailed Nov. 10, 2011; 24 pages.

Holmes; Non-Final Office Action for U.S. Appl. No. 13/284,915, filed Oct. 30, 2011; mailed Dec. 7, 2011, 9 pages.

Holmes, IV, William W.; Non Final Office Action for U.S. Appl. No. 13/216,523, filed Aug. 24, 2011, mailed Feb. 15, 2012, 9 pgs.

Holmes IV, William W.; Final Office Action for U.S. Appl. No. 12/711,050, filed Feb. 23, 2010, mailed Feb. 16, 2012; 22 pgs.

Holmes IV, William W.; Restriction Requirement for U.S. Appl. No. 13/113,684, filed May 23, 2011, mailed Mar. 5, 2012, 6 pgs.

Holmes, IV, William W., Applicant-Initiated Interview Summary for U.S. Appl. No. 13/284,915, filed Oct. 30, 2011, mailed Mar. 16, 2012, 3 pgs.

Holmes; Applicant-Initiated Interview Summary for U.S. Appl. No. 12/711,050, filed Feb. 23, 2010, mailed Mar. 27, 2012; 3 pgs.

Holmes; Final Office Action for U.S. Appl. No. 13/284,915, filed Oct. 30, 2011, mailed Apr. 10, 2012; 29 pgs.

Holmes IV, William W., Non-Final Office Action for U.S. Appl. No. 13/113,684, filed May 23, 2011, mailed Apr. 12, 2012; 9 pgs.

Holmes, IV, William W.; Non-Final Office Action for U.S. Appl. No. 12/711,050, filed Feb. 23, 2010, mailed May 9, 2012; 20 pgs.

Holmes, William W.; U.S. Patent Application Entitled: Simplified Low Insertion Force Sealing Device Capable of Self Restraint and Joint Deflection, U.S. Appl. No. 13/475,335, filed May 18, 2012, 28 pgs.

Bridges, J.S. "The Evolution of Piping", Handbook of Cast Iron Pipe for Water, Gas, Steam, Air, Chemicals and Abrasives, May 1927, 3 pgs.

Article entitled, "Rubber-Gasket Joints for Ductile-Iron Pressure Pipe and Fittings", American Water Works Association, Mar. 1, 2007, 3 pgs.

Fisher, Virginia E. "The History of United States Pipe and Foundry Company: A Centennial Celebration", Mar. 1999, 4 pgs.

Article entitled, "Integrated Operation of United States Pipe and Foundry Company", United States Pipe and Foundry Company, 1956, 3 pgs.

Article entitled, "Ductile Iron Pipe", located at www.uspipe.com/Main/Default.asp?CategoryID=4&SubCategoryID = 1 accessed on Jul. 12, 2012; 1 pg.

Article entitled, "Joint Restraint", located at www.uspipe.com/main/Default.asp?CategoryID=4&SubCategoryID=5 accessed on Jul. 12, 2012; 2 pgs.

Holmes; PCT Application entitled: Simplified Low Insertion Force Sealing Device Capable of Self Restraint and Joint Deflection having serial No. PCT/US10/25074, filed Feb. 23, 2010, 31 pgs.

Holmes; International Search Report and Written Opinion for serial No. PCT/US10/025074, filed Feb. 23, 2010, mailed Apr. 21, 2010, 2 pgs.

Holmes IV, William W.; Final Office Action for U.S. Appl. No. 12/711,050, filed Feb. 23, 2010, mailed Aug. 29, 2012; 26 pgs.

Holmes; U.S. Provisional Patent Application entitled: Parabolic Ramp Self-Restraining Bell Joint having U.S. Appl. No. 61/250,160, filed Oct. 9, 2009, 19 pgs.

Holmes; U.S. Provisional Patent Application entitled: Simplified Low Insertion Force Sealing Device Capable of Self Restraint and Deflection having U.S. Appl. No. 61/301,462, filed Feb. 4, 2010, 29 pgs.

Holmes; U.S. Provisional Patent Application entitled: Simplified Low Insertion Force Sealing Device Capable of Self Restraint and Joint Deflection having U.S. Appl. No. 61/347,612, filed May 24, 2010, 32 pgs.

Holmes; U.S. Provisional Patent Application entitled: Self-Restrained Pipe Joint System and Method of Assembly having U.S. Appl. No. 61/250,740, filed Oct. 12, 2009, 19 pgs.

Holmes, IV, William W.; Applicant-Initiated Interview Summary for U.S. Appl. No. 12/711,050, filed Feb. 23, 2010, mailed Oct. 17, 2012; 5 pgs.

Holmes, IV, William W.; Applicant-Initiated Interview Summary for U.S. Appl. No. 12/711,050, filed Feb. 23, 2010, mailed Aug. 29, 2012; 3 pgs.

German, Mikhail; Restriction Requirement for U.S. Appl. No. 12/902,888, filed Oct. 12, 2010; mailed May 29, 2012; 7 pages.

German, Mikhail; Applicant-Initiated Interview Summary for U.S. Appl. No. 12/902,888, filed Oct. 12, 2010, mailed Oct. 31, 2012, 3 pgs.

Holmes, William W. IV; U.S. Patent Application Entitled: Gasket for Parabolic Ramp Self Restraining Bell Joint, U.S. Appl. No. 13/543,763, filed Jul. 6, 2012; 39 pgs.

Holmes, William; Final Office Action for U.S. Appl. No. 13/113,684, filed May 23, 2011, mailed Jul. 20, 2012, 9 pgs.

German, Mikhail; U.S. Patent Application entitled: Self-Restrained Pipe Joint System and Method of Assembly, having U.S. Appl. No. 12/902,888, filed Oct. 12, 2010; 24 pgs.

German, Mikhail; Non Final Office Action for U.S. Appl. No. 12/902,888, filed Oct. 12, 2010, mailed Jul. 23, 2012; 12 pgs.

Holmes, William W. IV; International Search Report and Written Opinion for U.S. Appl. No. PCT/US2011/048953, filed Aug. 24, 2011, mailed Apr. 3, 2012; 10 pgs.

International Preliminary Report on Patentability for serial No. PCT/US2011/037565, filed May 23, 2011, mailed Sep. 8, 2011, 7 pgs.

Holmes IV, William W.; Non-Final Office Action for U.S. Appl. No. 13/113,684, filed May 23, 2011, mailed Nov. 9, 2012; 25 Pgs.

Holmes, William W. IV; Non-Final Office Action for U.S. Appl. No. 12/711,050, filed Feb. 23, 2010, mailed Dec. 20, 2012, 23 pgs.

German, Mikhail; Final Office Action for U.S. Appl. No. 12/902,888, filed Oct. 12, 2010, mailed Jan. 28, 2013; 30 pgs.

Holmes, William W. IV; International Preliminary Report on Patentability for serial No. PCT/US2011/048953, filed Aug. 24, 2011, mailed Feb. 26, 2013; 6 pgs.

Holmes IV, William W.; Final Office Action for U.S. Appl. No. 13/113,684, filed May 23, 2011, mailed Mar. 4, 2013; 22 pgs.

Holmes, William W. IV; Non-Final Office Action for U.S. Appl. No. 13/543,763, filed Jul. 6, 2012, mailed Mar. 26, 2013, 25 pgs.

Holmes IV, William W.; Non-Final Office Action for U.S. Appl. No. 13/103,126, filed May 9, 2011, mailed Apr. 2, 2013, 27 pgs.

German, Mikhail; Applicant-Initiated Interview Summary for U.S. Appl. No. 12/902,888, filed Oct. 12, 2010, mailed Apr. 4, 2013, 3 pgs.

Holmes, IV, William W.; Non-Final Office Action for U.S. Appl. No. 13/475,335, filed May 18, 2012, mailed Apr. 3, 2013, 28 pgs.

Holmes IV, William W.; Final Office Action for U.S. Appl. No. 12/711,050, filed Feb. 23, 2010, mailed Apr. 11, 2013; 30 pgs.

German, Mikhail; Applicant-Initiated Interview Summary for U.S. Appl. No. 12/902,888, filed Oct. 12, 2010, mailed Apr. 16, 2013, 3 pgs.

Holmes IV, William W.; Notice of Allowance for U.S. Appl. No. 13/543,763, filed Jul. 6, 2012, mailed May 24, 2013, 13 pgs.

Holmes IV, William W.; Notice of Allowance for U.S. Appl. No. 13/113,684, filed May 23, 2011, mailed Jun. 28, 2013, 16 pgs.

* cited by examiner

SIMPLIFIED LOW INSERTION FORCE SEALING DEVICE CAPABLE OF SELF RESTRAINT AND JOINT DEFLECTION

CROSS-REFERENCE TO RELATED APPLICATION

This application is a divisional of U.S. application Ser. No. 13/113,684, filed on May 23, 2011 which claims the benefit of U.S. Provisional Application 61/347,612, filed on May 24, 2010, both of which are hereby incorporated by reference herein in their entirety.

FIELD

The disclosure is directed to couplings and methods of coupling, particularly to bell and spigot couplings and methods. The couplings can be between pipes, fittings, and/or other piping components. The couplings allow for greater pipe deflection and stronger joint retention, with less force needed on insertion.

BACKGROUND

Members of the flow control industry, such as producers of pipeline components for the transmission of water, gas, oil, or other fluids have focused substantial attention on the problem of creating and maintaining connections between adjacent lengths of pipe, or pipes and fittings, or pipes and valves. In applications where the fluid, such as water for fire mains or water distribution in municipalities, is under high pressure, various means are used to prevent separation of the joints between piping components. Piping components are joined to prevent separation caused by thrust forces, earth movement, and external mechanical forces exerted on piping components. These components include, for example, pipes, couplings, fittings, valves, and fire hydrants. The majority of the solutions can be categorized into either "push-on joints," "mechanical joints," or "flanged joints."

Iron pipe has traditionally been used to withstand the large pressures that are necessary for municipal water systems and other systems. Those pressures are needed to carry fluids over long distances, to carry large amounts of fluids, and to prevent contamination of the systems in the event of a hole or other breach of the system. There are two related problems in the history of using pipes of any sort, including iron pipe: (1) creating a secure seal to join the pipes and to withstand large pressures, and (2) bending or deflecting the joints of the pipes to meet the intended use of the pipes.

The first substantial use of cast iron pipe was in Europe in the 17th century. The piping systems of the 17th and 18th centuries primarily had flanged ends that bolted together with lead or rawhide gaskets for sealing. Flanged joints continue to be used for some applications today but with rubber gaskets. Flanged joint systems are costly to install and require considerable maintenance.

The first bell and spigot joint was developed by Thomas Simpson of the Chelsea Water Company in England in 1785. The joint was caulked with jute rope impregnated with pine resin or tallow and sealed in place with molten lead. The bell and spigot joint, remained the predominant pipe joint until the advent of the push-on joint, for example the TYTON® Joint, in 1956.

There are numerous methods of securing piping components in series to make up a pipeline, roughly divisible into three main, categories: (1) rigid, as with bolted flange connections; (2) flexible, as with numerous designs such as TYTON® push-on joints and gaskets, or TYTON® combined with self-restraining gaskets bearing toothed inserts, such as FIELD LOK 350® Gaskets providing both sealing and autonomous restraint; and (3) others with a limited amount of incidental flexibility, such as PVC Pipe with Rieber Gaskets where minor flexibility is possible due to the plasticity of the gasket and pipe materials and to joint tolerancing.

Push-on solutions are exemplified by U.S. Pat. No. 2,953,398, and account for the majority of straight-run pipe connections. In a typical configuration, a spigot of a pipe slides into a bell of another pipe past a tightly fitted gasket. A variation of the push-on joint is evidenced by U.S. Pat. No. 2,201,372, which employs a compression snap-ring fitted within a special lip of the bell, in order to exert pressure onto locking segments and thus drive them into the spigot, restraining the joint against thrust forces. U.S. Pat. No. 3,445,120, likewise employs a gasket with toothed locking segments encased therein that are generally disposed such that they and the gasket may roll between a locked and a free position. As the gasket bulb rotates under extraction forces, it is intended eventually to encounter a position in which the segments must compress the gasket to allow further rotation of the segment and engagement of the teeth with the mating pipe spigot, thereby terminating the rotation and compression of the gasket bulb and restraining the joint.

Other examples of restrained push-on joints include those disclosed in U.S. Pat. Nos. 5,295,697, 5,464,228, and 5,067,751. In those references, the connection is effected by either locking segments or wedges within the gasket that engage the spigot. The locking segments possess a groove that mates with an annular rib on the bell, such that the rib acts as a rocker, or cam, or, alternatively, as a wedge. During insertion of the spigot into the bell, the segments rotate on the rib, but are prevented from appreciable axial movement by the mating of the rib and groove. Upon experiencing counter-forces tending to effect removal of the spigot, the rib acts as a cam, both causing the segments to pivot on the rib as an axis, and exerting a radially inward pressure as the segment attempts to slide past the rib. These types of joints depend on compressive force on the rubber gasket to maintain the connection of the pipes.

While the push-on type joint has obtained wide acceptance for pipe joints, acceptance for fittings, valves, and hydrants is much lower. The contours of bell sockets of the push-on joint require a high degree of precision for a cast surface. In restrained joints, an additional locking joint is necessary, which also requires a high degree of precision to manufacture. It often takes a high degree of skill and alignment precision, as well as substantial force (i.e. in the range of 600 to 800 pounds of force for an eight inch size pipe), to assemble joints using the above described push-on type joints. The insertion force with present push-on designs increases proportionally with conduit diameter. Moreover, insertion forces increase substantially in low-temperature conditions.

A current trend in the industry is to manufacture pipe with walls much thinner than the current designs. Whether the pipe end is produced in a manufacturing plant or is the result of field cuts required to adjust the length of the pipe, such pipes cannot realistically be beveled or have rounded ends. Damage to the gaskets or displacement of the gaskets is a likely outcome when inserting a spigot end of a pipe not property aligned or without a beveled or rounded end into the bell of another push-on joint pipeline component. A further consequence of the high assembly forces required is that installers favor mechanical joint connections for fittings, valves, and hydrant shoes because they require lower assembly forces.

Attempts to design low-insertion-resistance joints have been made in the past, but these designs were not completely satisfactory because normal conical inner surfaces do not allow for sufficient deflection of the bell and socket joint. For example, U.S. Pat. No. 3,815,940 and U.S. Patent Application Publication No. 2009/0060635 both show bells with conical inner surfaces. Cast iron pipe is rigid and does not permit deflection. Creating ductile iron pipe permits slightly greater deflection at the joint. However, that deflection carries an increased risk of loss of pressure. If the joint is a straight connection, no deflection is possible. If the joint is connected into a cone-shaped annulus, deflection of more than a few degrees would degrade the connection opposite the angle of deflection, ultimately leading to a greater potential for a loss of pressure. Small movements in the earth could, over time, cause leaks in underground piping systems.

Thus, there is a need for a connection that is less sensitive to misalignment and temperature extremes, has reduced frictional resistance to the insertion of the spigot until the desired connection is achieved and the coupling is maintained, and maintains a seal under high pressures even if the joint is deflected.

SUMMARY

The present disclosure overcomes the problems and disadvantages associated with current strategies and designs by providing new devices and methods for connecting bell and spigot pipeline components. Specifically, one embodiment solves the problem created by cone-shaped joints by using a parabolic-shaped joint. The joint is less likely to lose restraint and pressure as the joint is deflected, permitting deflections up to 10 degrees, preferably between 9 and 5 degrees of deflection, and more preferably of 7 degrees of deflection or less. A 90-degree turn can thus be made using approximately 15 (20-foot) pipes over a distance of approximately 300 circular feet with deflections of 6 degrees, as opposed to 30 pipes over a distance of 600 circular feet using 3 degree deflection joints. That greater deflection reduces the number of bend fittings and the amount of trench digging required and conserves land space.

An embodiment is directed to a conduit that comprises at least one bell with an end face, an internal portion, and a concave inner surface between the end face and the internal portion. The diameter of the inner surface adjacent to the internal portion is greater than the diameter of the inner surface adjacent to the end face.

In preferred embodiments, the inner surface is a truncated elliptic paraboloid. In preferred embodiments, the conduit has a bell at a first end and a spigot at a second end. Preferably, the conduit is cylindrical and is made of at least one of ferrous metals (e.g. steel and cast iron), non-ferrous metals (e.g. copper-based alloys), or plastic (e.g. PVC or HDPE).

Another embodiment is also directed to a conduit that includes multiple openings wherein at least one opening has a bell that couples to another piping component having a spigot. In preferred embodiments, the inner surface of the bell is concave. The inner surface is preferably a truncated elliptic paraboloid. In preferred embodiments, the conduit has a bell at a first end aid a spigot at a second end. Preferably, the conduit is cylindrical and is made of at least one of ferrous metals (e.g. steel and cast iron), non-ferrous metals (e.g. copper-based alloys), or plastic (e.g. PVC or HDPE).

Another embodiment is directed to a sealing device. The sealing device comprises at least one segment having a convex outer surface and a K-type gasket coupled to the segment. In the preferred embodiments, the segment is a locking segment. The locking segment functions as a restraining device and an anti-extrusion device to prevent the joint from separating and the elastomeric seal from being extruded out of the joint when subjected to high internal hydraulic forces. In other embodiments, a guide segment without teeth is substituted for the locking segment and serves as an anti-extrusion device for the polymeric material of the sealing portion.

In preferred embodiments, the segment is of a first material and the K-type gasket is of a second material. In preferred embodiments the K-type gasket is comprised of a coupling section and a sealing section. The sealing section is preferably comprised of an upper section and a lower section, each extending from the coupling section. The coupling section, in preferred embodiments, has one or more expansion or contraction grooves in the outer or inner periphery. The locking segment, in preferred embodiments, has at least one engagement device. Preferably, the engagement device is annular.

Another embodiment is directed to a conduit coupling system. The system comprises at least two piping components and a sealing device. A first component has a bell and a second component has a spigot, the spigot is adapted to mate with the bell. The bell includes a first end and a second end, wherein the first end is coupled to the first component. The bell socket has a concave annular inner surface and a diameter of the annular inner surface adjacent to the first end of the bell socket is greater than a diameter of the annular inner surface adjacent to the second end of the bell socket. The sealing device includes a segment comprising a convex outer surface and a K-type gasket coupled to the segment. The sealing device is adapted to fit between the bell socket and the spigot end.

In preferred embodiments, the segment is a locking segment. Each locking segment is adapted to engage an outer surface of the spigot. The inner surface of the bell socket is preferably a truncated elliptic paraboloid. Each component preferably comprises a bell at a first end and a spigot or bell at a second end, and each component is cylindrical. Each component can be made of ferrous metals (e.g. steel and cast iron), non-ferrous metals (e.g. copper-based alloys), or plastic (e.g. PVC or HDPE).

In preferred embodiments, the locking segment is of a first material and the K-type gasket is of a second material. Preferably, the first material is harder than the material of the spigot. In preferred embodiments, the K-type gasket has a coupling section and a sealing section. The sealing section is preferably comprised of an upper section and a lower section, each extending from the coupling section. Preferably the locking segment has at least one engagement device. In preferred embodiments, the sealing device is annular.

Another embodiment is a method of coupling at least two conduits of the disclosure. The method includes the steps of positioning a sealing device inside a bell coupled to one end of a first conduit, inserting a spigot of a second conduit through the sealing device inside the bell, and partially removing the spigot from the bell. A locking segment of the sealing device engages the outer surface of the spigot as the spigot is partially removed from the bell. The sealing device is adapted to move axially within the bell in the direction of the insertion of the spigot, and the movement is assisted by the presence of expansion and contraction grooves in the coupling section of the gasket. This movement allows the locking segment to be displaced from the path of the incoming spigot with little increase in insertion force. The axial movement may be confined to one segment of the sealing device to accommodate angular and radial misalignment of the incoming spigot. The sealing device is adapted to move In the direction of the partially removed spigot from the bell in response to internal hydraulic pressure to effect a seal to the spigot that rests in an angular and radial misaligned position.

In preferred embodiments, the bell has a first end and a second end. The first end is coupled to the first conduit. The bell has a concave annular inner surface, and a diameter of the annular inner surface adjacent to the first end of the bell socket is greater than a diameter of the annular inner surface adjacent to the second end of the bell socket.

In certain embodiments, radial loading of the locking segment increases as the spigot is removed from the bell. The radial loading of the locking segment can increase exponentially as the segment moves toward the front of the bell following the parabolic curve toward the vertex. Preferably, the sealing device includes at least one locking segment comprising a convex outer surface and a K-type gasket coupled to the locking segment. Preferably the K-type gasket is compressed upon insertion of the spigot. The withdrawal of the spigot end can be due to external forces or internal hydraulic forces.

Other embodiments and advantages are set forth in part in the description, which follows, and in part may be obvious from this description or may be learned from the practice.

DESCRIPTION OF THE DRAWINGS

This disclosure describes in greater detail features appertaining thereto by way of example only and with reference to the attached drawings, in which.

DESCRIPTION

As embodied and broadly described herein, the disclosures herein provide detailed embodiments of the disclosed system, device, and method. However, the disclosed embodiments are merely examples that may be embodied in various and alternative forms. Therefore, there is no intent that specific structural and functional details should be limiting, but rather the intention is that they provide a basis for the claims and as a representative basis for teaching one skilled in the art to variously employ the principles of the present disclosure.

A problem in the art capable of being solved by the disclosed embodiments is coupling piping components and maintaining the assembly. It has surprisingly been discovered that certain configurations of the interior surface of a bell socket increase ease of assembly and allow for deflection between components. Furthermore, it has surprisingly been discovered that, certain configurations of the outer surface of a gasket increase the gasket's ability to maintain assembly during use of the components including under high pressure applications.

Figure 1:
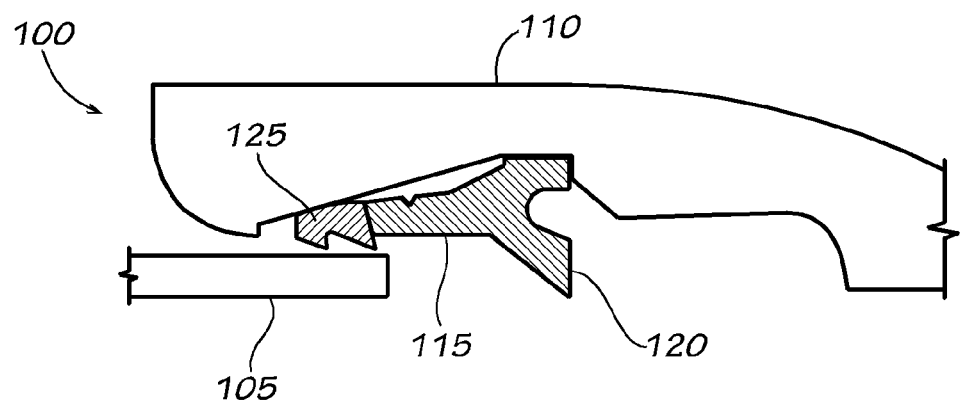
FIG. 1 is a partial cross-sectional view of an embodiment of the system of the disclosure.

FIG. 1 depicts a cutaway view of the components of the upper segment of system 100. System 100 includes a spigot 105, a bell 110, and a sealing device 115. Each of spigot 105, bell 110, and sealing device 115 is shown in partial cross-section. In the preferred embodiment, each of spigot 105, bell 110, and sealing device 115 is annular in shape having a common axis below FIG. 1. Each of spigot 105, bell 110, and sealing device 115 can have any diameter that may be commonly found in piping systems. Preferably the diameter of each of spigot 105, bell 110, and sealing device 115 is between one-half inch and one hundred and twenty inches, more preferably between one-half inch and seventy two inches.

In a preferred embodiment, system 100 is used to join lengths of pipes. The pipes can be of any length. Additionally, one pipe can have one spigot end and one bell end, two spigot ends, two bell ends, or a combination thereof. In other embodiments, there can be at least one spigot and/or bell located along the length of the pipe positioned perpendicularly or at an angle to the axis of the pipe. In other embodiments, system 100 can be used to join two or more pipes to other components (e.g. fire hydrants, valves, and/or fittings), or can be used to join components together. System 100 can be used for any fluid, including gas, water, or oil, for example. In the preferred embodiment, sealing device 115 has a gasket end 120 and a locking segment 125. However, in certain embodiments, segment 125 can be an anti-extrusion element (described herein).

In the preferred embodiment, spigots 105 are made of ductile iron, steel, or plastic and segments 125 are made of a substantially rigid material such as ductile iron, steel, or hardened plastic. However other material may be used, preferably but not limited to ferrous metals (e.g. steel and cast iron), non-ferrous metals (e.g. copper-based alloys), or plastic (e.g. PVC or HDPE). Pipes can have walls of any thickness, including, but not limited to, between ⅛ inch and 1¼ inches. Fittings can have walls of any thickness, including, but not limited to, between ¼ inch and 2 inches.

In the preferred embodiment, sealing device 115 is of a diameter larger than spigot 105 and has an annulus at the back with a diameter slightly smaller than the diameter of spigot 105. The sealing device 115 is preferably dimensioned such that spigot 105 can be inserted into sealing device 115 without encountering intentional resistance until such time as it reaches the inner end of bell 110. Insertion forces are reduced by several orders of magnitude compared to compression type seals. If resistance is encountered during insertion of the spigot into the locking segment 125, then, due to the plasticity of the gasket as assisted by a compression groove 330 (shown in FIG. 3), the segment 125 is able to reduce the resistance by moving up and away from contact with the spigot 105.

Figure 2:
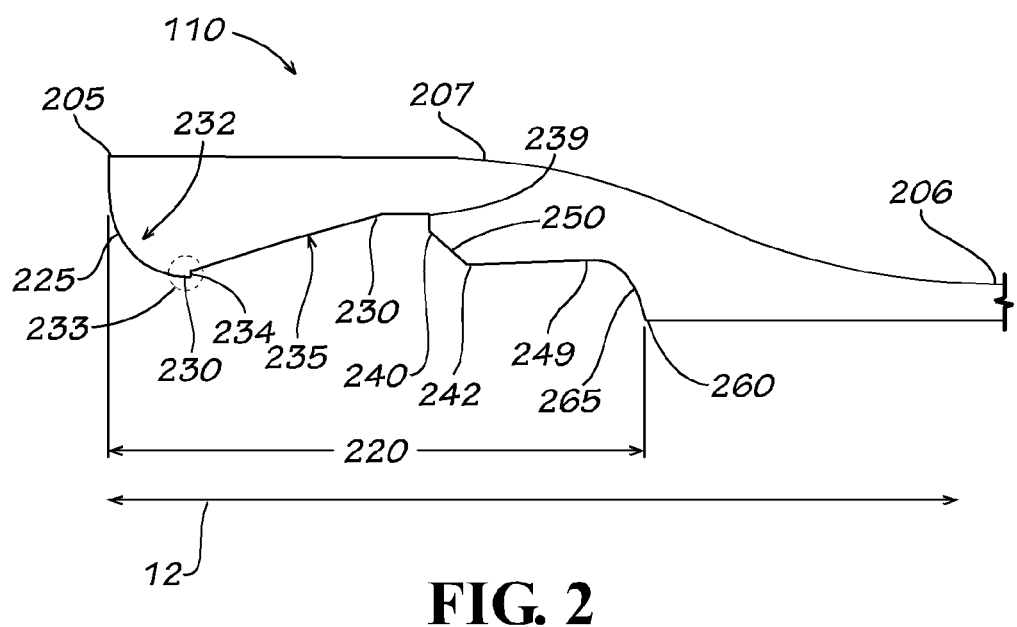
FIG. 2 is a partial cross-sectional view of an embodiment of the bell.

FIG. 2 depicts a cutaway view of a section of a bell 110. The center line of the bell 110 is illustrated by a dashed line 12. The outer shape of bell 110 is best described by the relative external diameters of the pipe's different points. Bell 110 has an external diameter at the point 205 and a smaller external diameter at point 206 some length along the bell 110. The transition of the external surface of bell 110 from point 205 to point 206 is a gradual curve providing that section of the bell 110 with the appearance of a bell. Preferably a constant external diameter is maintained between point 205 and 207 with a gradual change of external diameter from point 207 to 206. The internal section of the bell 110 (from point 205 to point 260) is referred to as the bell socket 220. Bell 110 is usually integrally formed, but, for the purpose of this disclosure, bell 110 can be divided into a number of sections.

The first section extends from point 205 to point 230. The internal radius of bell 110 between center line 12 and point 205 (R1) is greater than the internal radius of bell 110 between center line 12 and point 230 (R2). The transition of the inner surface from internal radius R1 to R2 is a smooth curve and is referred to as bell throat 225. An example of a smooth curve is a segment of a circle of predetermined radius. An effective radius 232 for the smooth transition depends on the distance from point 205 to point 230, internal radius R1, and internal radius R2. Preferably, radius 232 is adapted to facilitate insertion of spigot 105 into bell 110.

The second section of bell 110 extends from point 230 to point 231. The second section includes a retainer portion 233 extending from point 230 to point 234. The internal radius at point 230 is R2 and immediately transitions to an internal radius R3 between center line 12 and point 234. R3 is greater than R2. The portion of the second section from reference point 234 to reference point 231 is provided with, an inner surface 235 that is concave with reference to the center line 12. The concave inner surface 235 may have a variety of shapes, including but not limited to a truncated cone, a truncated elliptic paraboloid, a truncated sphere, or a combination thereof. Preferably, the curvature of inner surface 235 has a nose or "vertex" of a paraboloid aligned in an axial direction opening away from the "directrix." As explained herein, concave inner surface 235 provides a function that enables the ease of assembly and allows for increased angle of deflection by spigot 105 when inserted into bell 110.

The third section of bell 110 extends from point 231 to point 240 (which is also referred to herein as the socket shoulder 240). The portion of the third section from point 231 to point 239 defines the heel seat 239 for the gasket 120, and the portion of the third section of bell 110 from point 239 to point 240 defines the socket shoulder 240 by which the gasket 120 is held in place.

The fourth section of bell 110 extends from point 240 to point 260 (which is also referred to herein as the land stop 260). This section has a sloped portion 250 (which is also referred to herein as the clearance slope 250). The radius from the center line 12 to point 242 (R4) is larger than the external radius of the spigot 105 in FIG. 1. The second portion of the fourth section includes a relatively flat surface in the lower portion from, point 242 to point 249 (which is referred to herein as the land 249). The third portion of the fourth section extends from point 249 to point 260 (which is referred to herein as the land stop 260). The land stop 260 has an internal radius R5 that is substantially equal to the internal radius of spigot 105. Typically, spigot 105 is the end of the pipe opposite to pipe bell 110.

Figure 3:
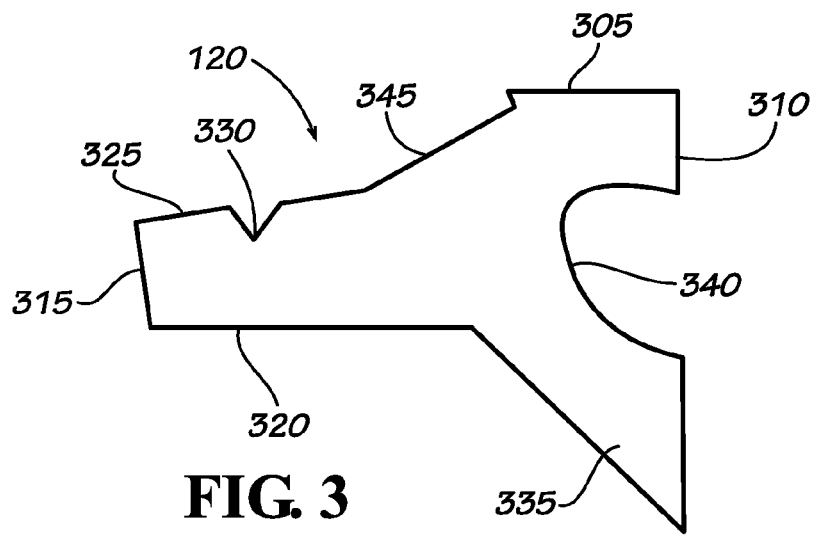
FIG. 3 is a partial cross-sectional view of an embodiment of the gasket.

Illustrated in FIG. 3 is a cutaway view of the upper segment of a gasket 120 used with the pipe bell 110 illustrated in FIG. 1. Gasket 120 is preferably made of an elastomer. However, other materials that are flexible, appropriate for the fluid, and provide a tight seal can be used. For example, gasket 120 can be made of SBR (Styrene butadiene rubber), EPDM (ethylene propylene diene monomer rubber), Nitirile, NBR (Nitrite butadiene rubber), and/or other synthetic and natural rubbers. In the preferred embodiment, gasket 120 is of a single durometer rubber. However, in other embodiments, two or more durometer rubbers can be used. Gasket 120 is preferably a K-type, lip, or wiper seal design, conforming to and fitting within the bell 110. Gasket heel 305 and gasket shoulder 310 mate with gasket heel seat 239 of bell 110 and socket shoulder 240 (as described with respect to FIG. 2). In the preferred embodiment, gasket heel 305 is slightly larger than, gasket heel seat 239, thereby compressing gasket heel 305 so that it is firmly anchored in bell socket 220 with gasket shoulder 310 against socket shoulder 240.

With reference to FIGS. 1-3, gasket 120 has a front edge portion 315 (also referred to as the front edge slope, segment edge, or front end) adapted to be disposed facing towards the open end of bell 110 that is illustrated in FIG. 1. Gasket 120 also has a substantially cylindrical portion 320 that, when inserted into bell 130, forms a gasket orifice. Gasket 120 includes a primary translation slope 325. The primary translation slope 325 allows for compression and translation of the rest of the gasket 120 whenever force is exerted on the front edge portion 315. Gasket 120 has an expansion and contraction groove 330 formed on the upper surface. In the preferred embodiment, expansion and contraction groove 330 is an annular cutout along the outer surface of gasket 120. However, in other embodiments, expansion and contraction groove 330 can be located on the inner surface of gasket 120. In other embodiments, there can be multiple expansion and contraction grooves located at various locations about gasket 120. Furthermore, expansion and contraction groove 330 can have any cross-sectional shape, including but not limited to triangular, rectangular, trapezoidal, and semicircular. The back edge of gasket 120 is formed as a concave pressure annulus pocket 340. Hydraulic pressure against pressure annulus pocket 340 increases the sealing pressure of lip seal 335 against the spigot 105. While annulus pocket 340 is shown as a single curved indentation, annulus pocket 340 can have multiple indentations and can have other shapes. Additionally, annulus pocket 340 can be of another material more compressible than the material of gasket 120.

Gasket heel seat 239 and socket shoulder 240 mate with and retain sealing device 115. In a preferred embodiment, adjacent to socket shoulder 240 is clearance slope 250. Clearance slope 250 permits passage of the water or other fluid into the pressure annulus groove of sealing device 115 (described herein). In a preferred embodiment, the inner portion of bell socket 220 is land 249, which extends from clearance slope 250 to land stop 260. Land 249 provides clearance for spigot 105 and limits over-deflection of the joint. Land stop 260 limits the insertion depth of spigot 105, while land curve 265 assists in casting by eliminating a sharp inner corner between land 249 and land stop 260.

Front edge slope 315 is the surface to which the locking segment 125a or anti-extrusion segment 125b is coupled. In the event that the edge of spigot 105 contacts the segment 125, in the preferred embodiment, front edge slope 315 is angled such that segment 125 and gasket 120 will be deflected outwardly and away from spigot 105, allowing the passage of spigot 105 through gasket orifice 320. Contraction groove 330 facilitates the bending or buckling of the gasket 120 and the gasket orifice 320. In operation, the primary translation slope 325 assists in stabilizing the front portion of gasket 120 and transferring forces to the expansion and contraction groove 330, which will bend and or buckle to assist hi the movement out of the path of an inserted spigot 105 until spigot 105 comes into contact with the front edge of lip seal 335. The effect of moving a portion of the gasket 120 out of the path of an inserted spigot 105 is to substantially reduce the friction and thereby reduce the amount of force necessary to insert the spigot 105 into the bell 110.

Figure 4A:
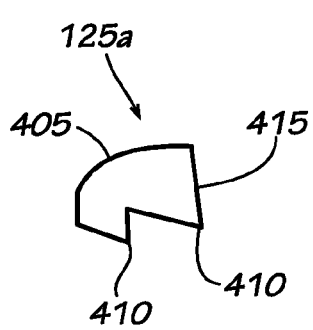
FIG. 4a is a partial cross-sectional view of an embodiment of the locking segment.

FIG. 4a depicts a cutaway view of the upper segment of segment 125, where segment 125a is a locking segment. Locking segment 125a is preferably made of AISI type 4140 steel (chromium steel). However other hard and durable materials can be used, for example AISI type 431 stainless steel. In preferred embodiments, segment 125 may be coated with an anticorrosion coating. The outer surface 405 of locking segment 125a is preferably a curved surface that makes contact with the concave inner surface 235 of bell socket 220. The curvature of outer surface 405, as shown in FIG. 4a, is merely for illustration purposes. The curvature can be greater or smaller than shown in FIG. 4a. In the preferred embodiment outer surface 405 is convex, more preferably a truncated paraboloid. However, in other embodiments, outer surface 405 can be another convex surface, a linear surface, or a concave surface. Preferably outer surface 405 opens away from bell throat 225. When the outer surface 405 of locking segment 125a moves against the inner surface 235 of bell socket 220, the segment 125 acts as a cam, follower and the inner surface 235 of the bell socket 220 acts as a cam. The cam action facilitates locking segment 125a in wedging between bell socket 220 and spigot 105, forcing the teeth 410 of locking segment 125a into the outer surface of spigot 105 and providing restraint against extraction of spigot 105. Due to the elasticity of gasket 115, locking segments 125a have freedom to move to maintain contact between outer surface 405 and the inner surface 235 of bell socket 220. Thus, segment 405 can accommodate misalignments between the two surfaces caused by, for example, casting variability in the bell 110, as well as a differential caused by the elliptical path of the locking segments 125a during deflection not matching exactly to inner surface 235.

Figure 4B:
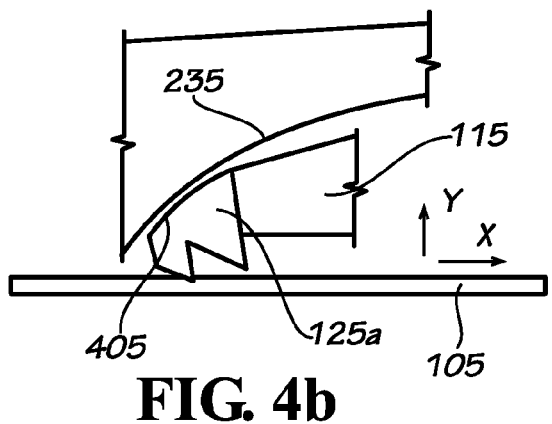
FIG. 4b is a partial cross-sectional view of an embodiment of the locking segment as it interacts with the inner surface of the bell socket.

The interaction between the outer surface 405 of locking element 125 and the inner surface 235 of the bell socket 220 is better illustrated in FIG. 4b. As stated previously, inner surface 235 of the bell socket 220 is concave and in a preferred embodiment follows the shape of a truncated paraboloid. Therefore, for every horizontal, displacement X of locking element 125 (the action of the outer surface 405 of the locking element 125 against the inner surface 235 the bell socket 220) there will be a vertical displacement Y of the locking element 125 commensurate with the function defining the shape of inner surface 235 of the bell socket 220. While locking segment 125a is shown with two teeth 410, one tooth 410 or more than two teeth 410 can be used. For thin walled spigots or PVC spigots, there will be more teeth 410 located closer together than in embodiments for use with thick wall iron spigots.

Another function of locking segments 125a is to assist in moving gasket 120 away from spigot 105 as spigot 105 is inserted into bell 110. Segment mounting slope 415 is angled such that the corresponding mating front end slope 315 of gasket 120 will help deflect, gasket 120 up and away from the path of spigot 105 so that passage is not impeded. Locking segment 125a is aided by primary translation slope 325 of gasket 120, which supports the portion of gasket 120 forward of expansion and contraction groove 330.

Figure 5:
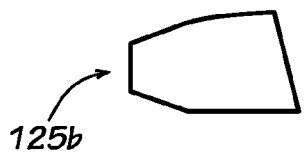
FIG. 5 is a partial cross-sectional view of an embodiment of the anti-extrusion segment.

In the preferred embodiment, segments 125 are equally spaced and mounted to front end slope 315 of gasket 120. Segments 125 reinforce the elastic gasket material against extrusion between throat 225 and spigot 105. In order for segment teeth 410 to penetrate spigot 105, it is preferable for locking segment 125a to be made of a material harder than spigot 105. FIG. 5 depicts a cutaway view of the upper segment of segment 125b, where segment 125b is an anti-extrusion segment for non-restraining joint gaskets. In embodiments where restraint between a mating bell 110 and spigot 105 is not desired or needed, segment 125b can be made without teeth as shown in FIG. 5. The toothless segment 125b functions similarly to the locking segment 125a in helping gasket 120 to facilitate deflection and preventing extrusion of gasket 120 between throat 225 of bell socket 220 and spigot 120 but has no teeth to penetrate spigot 105 and provide restraint. In some embodiments, both locking segments 125a and anti-extrusion segments 125b can be used in the same restraining device 115.

Figure 6:
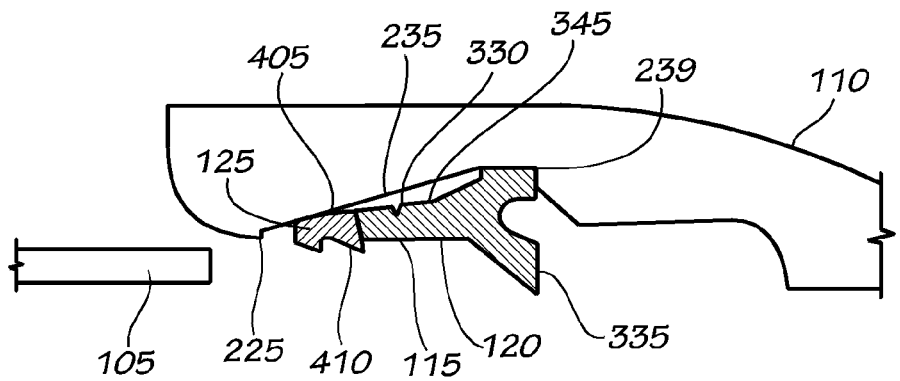
FIG. 6 is a partial cross-sectional view of an embodiment of the system with the spigot prior to insertion into the bell.
Figure 7:
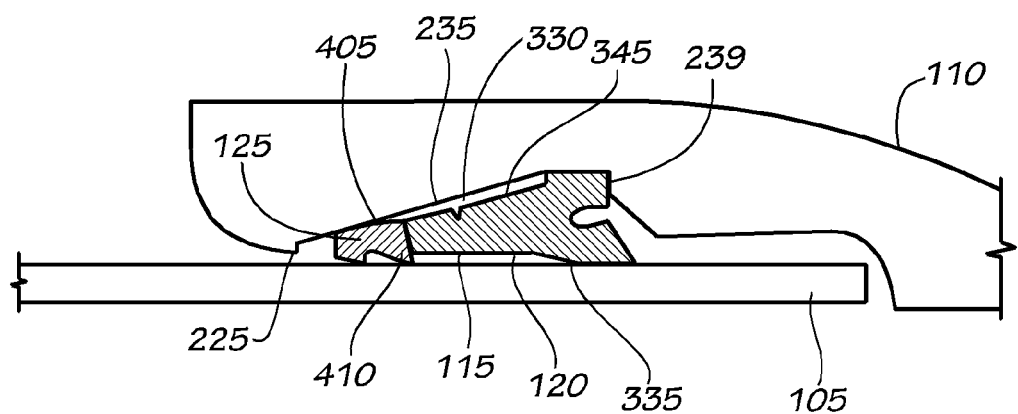
FIG. 7 is a partial cross-sectional view of an embodiment of the system with the spigot Inserted into the bell.

FIGS. 6-9 depict cutaway views of the steps of inserting spigot 105 through sealing device 115 and into bell 110. In FIG. 6, spigot 105 is aligned with bell 110. In the preferred embodiment, the centerline of spigot 105 is aligned with the center line of bell 110. However, in other embodiments, spigot 105 can be inserted into bell 110 at an angle. The angle can be less than 15°. Preferably, the angle is between 5° and 9°, and, more preferably, the angle is 7° or less. Upon contact and continued insertion of spigot 105 (as shown in FIG. 7), lip seal 335 will bend and stretch over spigot 105 imparting axial and circumferential tensile forces to gasket 120. The tensile forces cause the secondary translation slope 345 to force segments 125 into contact with spigot 105.

Insertion of spigot 105 through sealing device 115 will result in spigot 105 contacting locking segment 125. Ordinarily this would increase the friction exerted in spigot 105. However, in the preferred embodiment, as spigot 105 contacts locking segment 125, the forces exerted on the gasket 120 cause the gasket 120 to bend at contraction groove 330 and allow for the longitudinal and axial displacement of segment 125 along concave inner surface 235. The displacement of the gasket allows and guides the translation of segment 125 out of the way of incoming spigot 105 with a minimum force.

Figure 8:
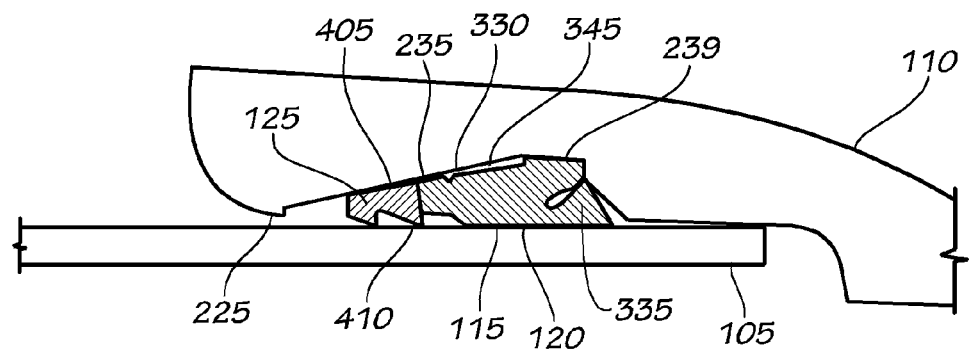
FIG. 8 is a partial cross-sectional view of an embodiment of the system with the gasket compressed more on the upper side due to deflection of the spigot.

The displacement of segment 125 is caused by a combination of axial and radial movement in response to the orientation of the incoming spigot 105 and dimensional variations of the joint components. The displacement of segment 125 can include off-axis rotation of segment 125 in response to spigot 105 being deflected or offset. The energy stored in gasket 120 as a result of the displacement keeps segment 125 in contact with spigot 105. Insertion of spigot 105 through sealing device 115 induces axial tensile forces in sealing device 115, or at least positions segment 125 to better engage spigot 105 when there is a withdrawal of spigot 105 from bell 130 (as shown in FIG. 8). The circumferential tensile force is exerted on lip seal 335 to form a seal between lip seal 335 and spigot 105. The seal is amplified when the joint is pressurized, and the material of gasket 120 causes the seal to be pressed more tightly against the spigot 105 and against the inner surface of bell 110 (as shown in FIG. 8). Gasket 120 can move independently of segment 125 once segment 125 is seated. Spigot 105 does not have to be fully inserted into bell 110 to seal.

Figure 9:
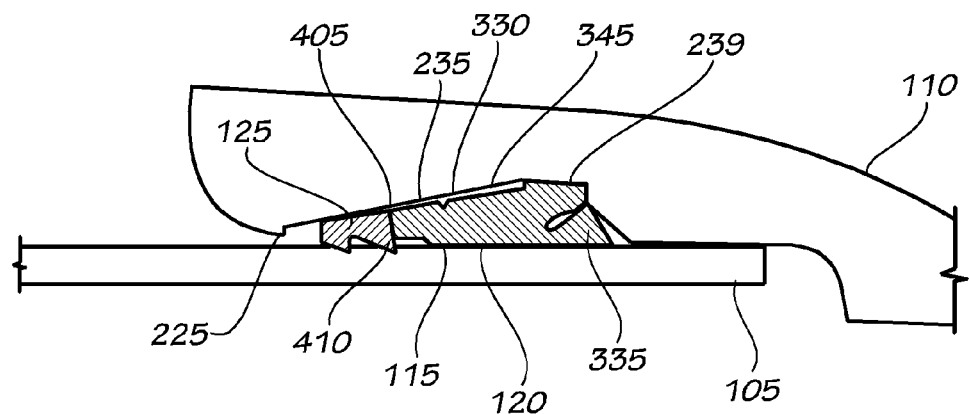
FIG. 9 is a partial cross-sectional view of an embodiment of the system with the locking segment engaged.

In the preferred embodiment, spigot 105 will be sealed once the inserted end of spigot 105 is inserted past lip seal 335, at which point, system 100 is water tight. Once the spigot 105 is in place, the spigot 105 or the bell 110 may be subjected to separation forces that tend to separate the spigot 105 from the bell 110. The separation forces may arise either from external forces or as a result of the internal pressure in the pipe. As shown in FIG. 9, separation forces cause the teeth 410 to engage spigot 105. The teeth 410 are engaged due to radial loading caused by the outer surface 405 of the segments 125 hearing against the progressively decreasing curved inner surface 235 of bell 110.

Since, in the preferred embodiment, bell 110 is shaped such that the diameter decreases at an increasing rate from gasket heel seat 239 to bell throat 225, withdrawal of the spigot 105 is met with increasing resistance as the similarly formed outer surface 405 of segments 125 is wedged between the bell 110 and the spigot 105. The flexibility that allows segment 125 to translate out of the path of the incoming spigot 105 also allows segment 125 to rotate into an off-axis position to maximize the engagement of teeth 410 with a misaligned or radially offset spigot 105 and to reduce the possibility of point-loading conditions.

When the joint is extended (pulled apart), the outer surface 405 of segment 125 mates with the inner surface 235 of bell socket 220 and forces teeth 410 into the outer surface of spigot 105 due to the parabolic wedging action of the outer surface of locking segment 125 being drawn in the direction of its vertex. Withdrawal of spigot 105, either due to external forces or the internal hydraulic action caused by pressurizing the joint, causes teeth 410 to engage spigot 105 and causes the convex outer surface 405 of locking segment 125 to engage the corresponding concave inner surface 235 of bell socket 220. As the withdrawal motion is continued, the engagement between the outer surface 405 of locking segment 125 and inner surface 235 is intensified by the increasingly smaller diameter of bell socket 220. This increases the inward radial loading on teeth 410, forcing them further to engage spigot 105. Extension of the joint is minimized due to the outer surface of locking segment 125 encountering an exponentially decreasing diameter of the inner surface 235 during pull-back, which exponentially increases the rate of radial loading of teeth 410 engaging spigot 105. In embodiments where there are multiple locking segments 125, the engagement pressure on the outer surface of locking segments 125 would be relatively equal since belt 110 and spigot 105 are in the form of concentric circles when axially aligned.

Figure 10:
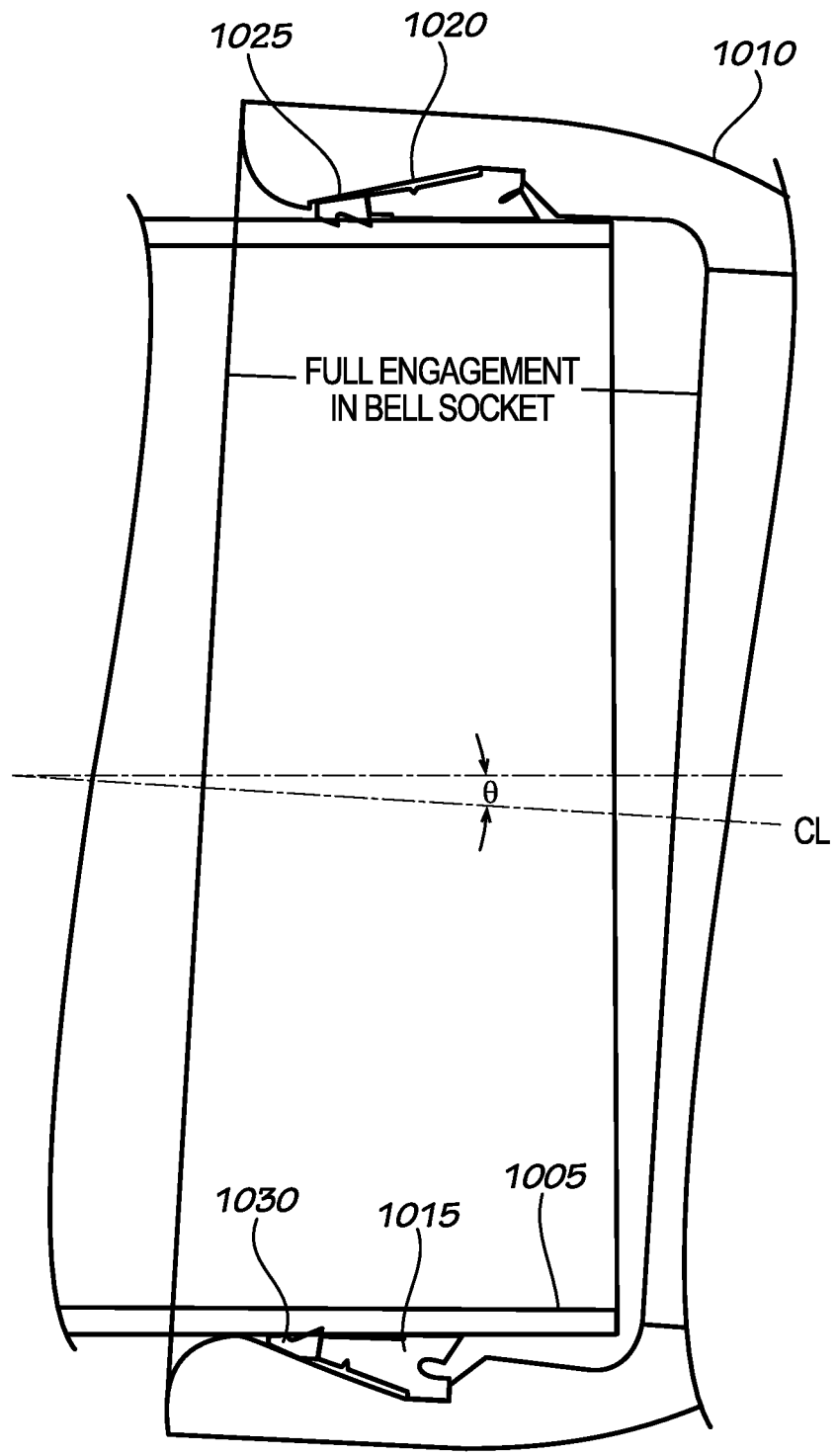
FIG. 10 is a cross-sectional view of an embodiment of the system with the spigot deflected within the bell.

FIG. 10 depicts a cross-sectional view of a spigot 1005 coupled to a bell 1010 deflected at an angle θ. The outer surface of segment 1025 facilitates a deflection, or bending, of the joint between spigot 1005 and bell 1010 by moving along inner surface 1020 of bell 1010. If θ is defined as the angle of deflection as measured from the centerline CL of the bell 1010 and spigot 1005 components, then in the direction of deflection, segment 1025 will move along curve 1020 in the direction of the vertex, or smaller end of curve 1020. At the other end of the coupling, in the opposite direction away from deflection, the opposing segment 1030 will move along the curve 1020 away from the vertex. Segments mounted around the gasket 1015 at intermediate locations between segment 1025 and segment 1030 will follow an elliptical path. The outer surfaces of these intermediate segments will maintain contact with the concave inner surface 1020 of bell 1010 due to the continuously changing shape of inner surface 1020. The major axis of the elliptical path can be defined by h=tangent (θ) times the effective diameter as measured across the outside surface of opposing segments. In the preferred embodiment, θ is less than or equal to 15°. More preferably θ is less than or equal to 10°; however, θ can be another angle.

In the preferred embodiment, when the joint is deflected, the outer surface of locking segment 125 follows a curve described by an ellipse in a plane inclined to the axis of the spigot. Each half of the ellipse on either side of the minor axis is a curve close enough in shape to a parabola so that the ellipse conforms closely to the paraboloid of bell 110 as the joint is deflected.

In the preferred embodiment, the inner surface 235 of bell 110 and the outer surface 405 of segment 125 follow the shape of truncated paraboloids, one positioned inside the other. The two paraboloids are axially aligned when the joint is in the undeflected position. Paraboloids are surfaces generated by rotating a parabola about its central axis.

In the preferred embodiment, no lubrication between spigot 105 and sealing device 115 is required. However, in other embodiments, lubricants can be used, for example dry film lubricants. The lubricant can ease in assembly and provide corrosion protection to sealing device 115.

In 8-inch pipe, for example, the force used to insert the spigot 105 into the bell 110, is between 25 to 300 pounds. With that level of force the insertion can be completed manually, without the use of mechanical devices other than to lift the piping component.

The following examples illustrate embodiments of this disclosure but should not be viewed as limiting the scope.

An experiment using two lengths of 8-inch pipe was conducted. One pipe had a bell as described herein while the other had a spigot as described herein. The two lengths were joined using a sealing device as described herein. The pipes were sealed at their respective open ends and the internal cavity was pressurized. The experiment was conducted first with the pipes having no deflection and then with the pipes having 5.7° and 7.0° of deflection. The results are compiled in Table 1.

TABLE 1

| Test Number | No. of Segments | Joint Deflection, ° | Minimum Pressure, psi | Maximum Pressure, psi | Test Result |
|---|---|---|---|---|---|
| 1 | 8 | 0 | 700 | 772 | Leak: Gasket Tear |
| 2 | 8 | 0 | 700 | 771 | Leak: Gasket Tear |
| 3 | 14 | 0 | 700 | 1192 | Leak: Gasket Tear |
| 4 | 10 | 0 | 700 | 998.5 | Leak: Gasket Tear |
| 5 | 10 | 5.7 | 700 | 828.2 | Leak: Gasket Tear |
| 6* | 14 | 0 | 700 | 1067.3 | No failure |
| 7* | 14 | 7.0 | 700 | 1028.6 | Leak from prior damage to gasket |

*Same gasket was used for Tests 6 and 7. Gasket sustained damage in removal after Test 6.

If "θ" is defined as the angle of deflection between the axis of the bell socket 1010 and the spigot 1005, through moderate angles of deflection, the locking segments 1025 following the major axis of an ellipse projected onto a plane inclined perpendicular to the axis will, on the side of the complementary angle (180°−θ) be positioned nearer the vertex of the paraboloid of the bell socket 1010, and those on the corresponding angle of deflection, θ, corresponding to the longer side of the major axis of the ellipse will follow the curve of the paraboloid and be positioned further out on the major axis but still in close proximity to the bell socket 1010. Thus the elliptical path of the deflected segments 1025 rotating within the paraboloid helps maintain proximity between the paraboloid outside surfaces of the locking segments 1025 and the paraboloid surface of the bell socket 1010 through moderate angles of deflection within the limits of the joint. At the center of rotation (during deflection), the segments 1025 are not displaced much beyond that of their original position on the circle perpendicular to the axis of the spigot 1005. The displacement or translation of the segments 1025 includes the ability to rotate into an off-axis position to improve the engagement with a misaligned spigot 1005 and to provide equalization of pressure between the bell curve and the spigot end through the segments 1025. Thus, the engagement pattern of the segments 1025 is approximately balanced around the spigot 1005 whether deflected or not through moderate angles of deflection of the joint. The advantage of this embodiment is that the joint, less likely to lose engagement or restraint as the joint is deflected, permitting deflection angles up to 10 degrees, preferably between 5 and 9 degrees, and more preferably 7 degrees or less. A 90-degree turn can thus be made using approximately 15 (20-foot) pipes over a distance of approximately 300 circular feet with deflections of 6 degrees, as opposed to 30 pipes over a distance of 600 circular feet using 3 degree deflection joints. That greater deflection reduces the number of bend fittings and the amount of trench digging required, and conserves land space.

Figure 11:
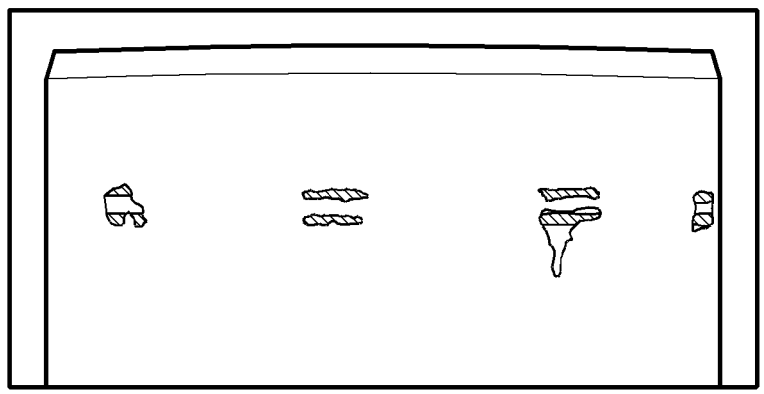
FIGS. 11-13 are samples of experimental engagement patterns.
Figure 12:
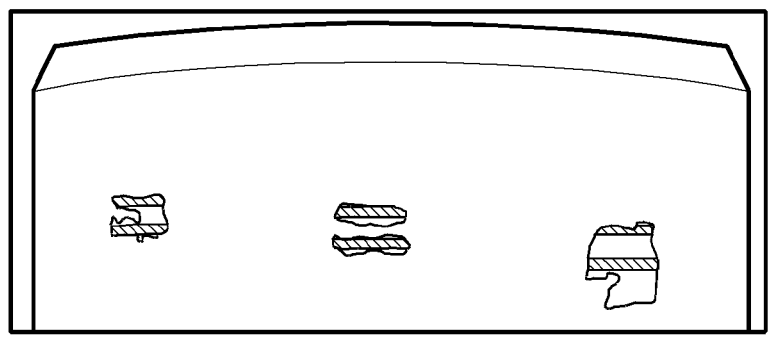
Figure 13:
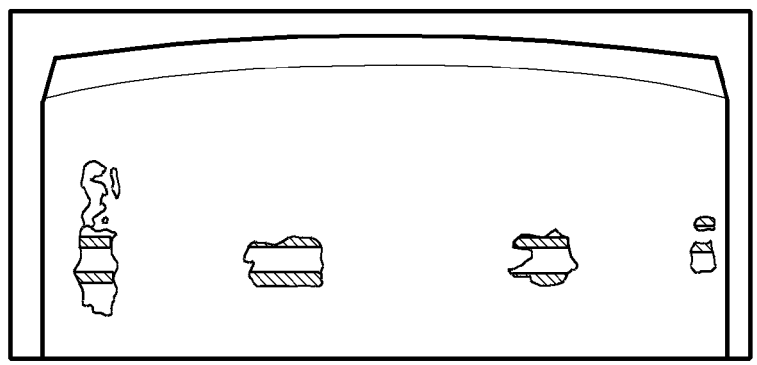

The validity of this assertion can be seen by the engagement pattern of segment teeth of a gasket on a pipe spigot 1005 as shown in FIGS. 11-13 for a joint that, was deflected 5.7° and pressurized to 828.2 psi before the gasket body ruptured. It can be seen that the engagement pattern follows an elliptical path about the pipe spigot 1005, and the depth of penetration of the teeth are approximately equal, indicating relatively equal pressures between the bell socket 1010, segments 1025, and spigot 1005, even though the joint is deflected. The joint in the photographs withstood a pressure of 828.2 psi before failure of the prototype gasket made of a catalyst-activated polyurethane.

Even though the gasket rubber failed, the joint maintained engagement and did not separate. The joints did not separate in any of the tests; all failures were due to leaks caused by tearing of the rubber when the tensile strength was exceeded due to internal pressure.

Figure 14:
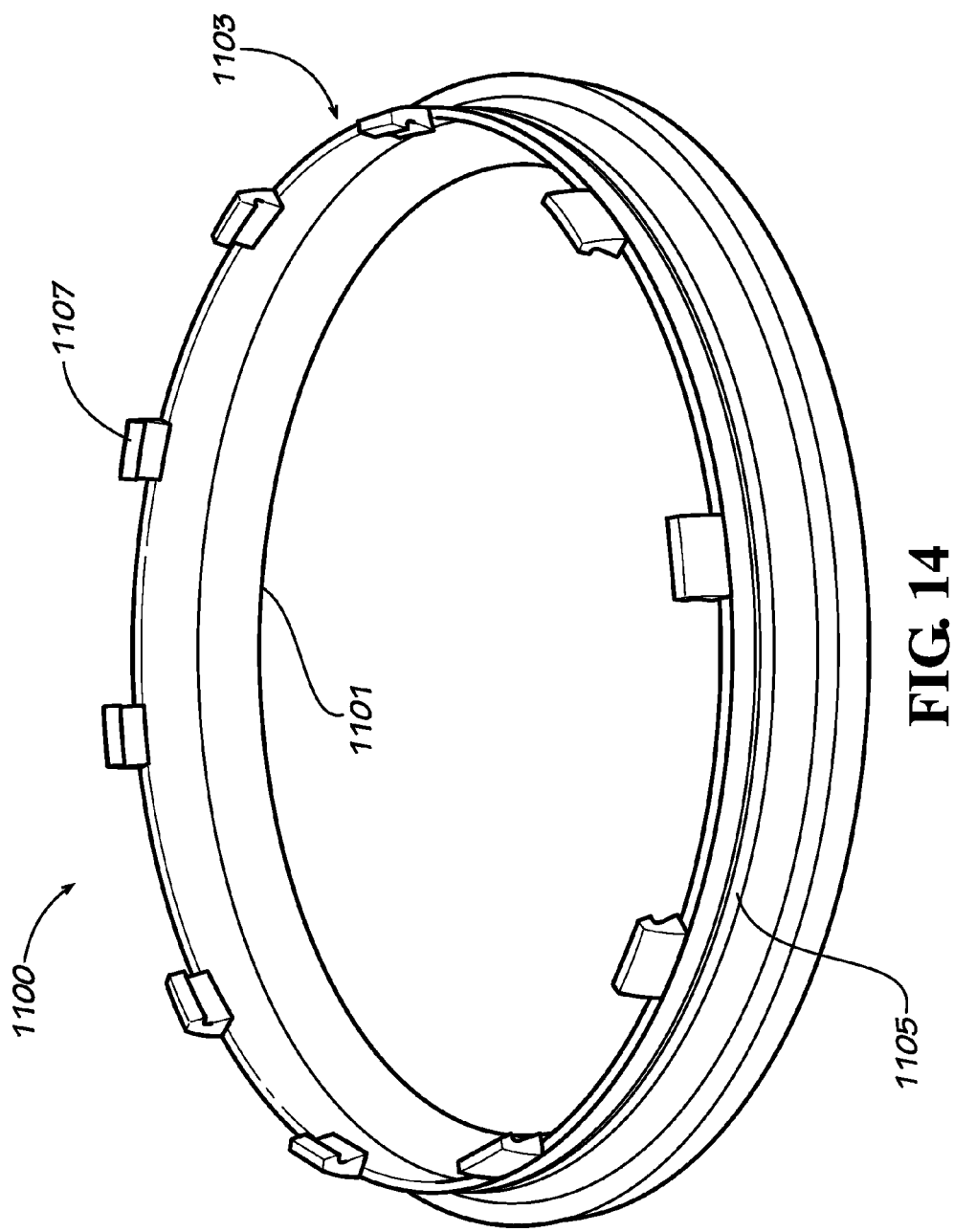
FIG. 14 is a perspective view of an embodiment of a gasket.

Illustrated in FIG. 14 is an embodiment of an annular elastomeric gasket assembly 1100. The gasket assembly 1100 has an annular body 1101 having an outer section 1103 with at least one groove 1105 in the outer circumference of the outer section 1103. Coupled to the outer section 1103 are a plurality of substantially rigid members 1107.

Figure 15:
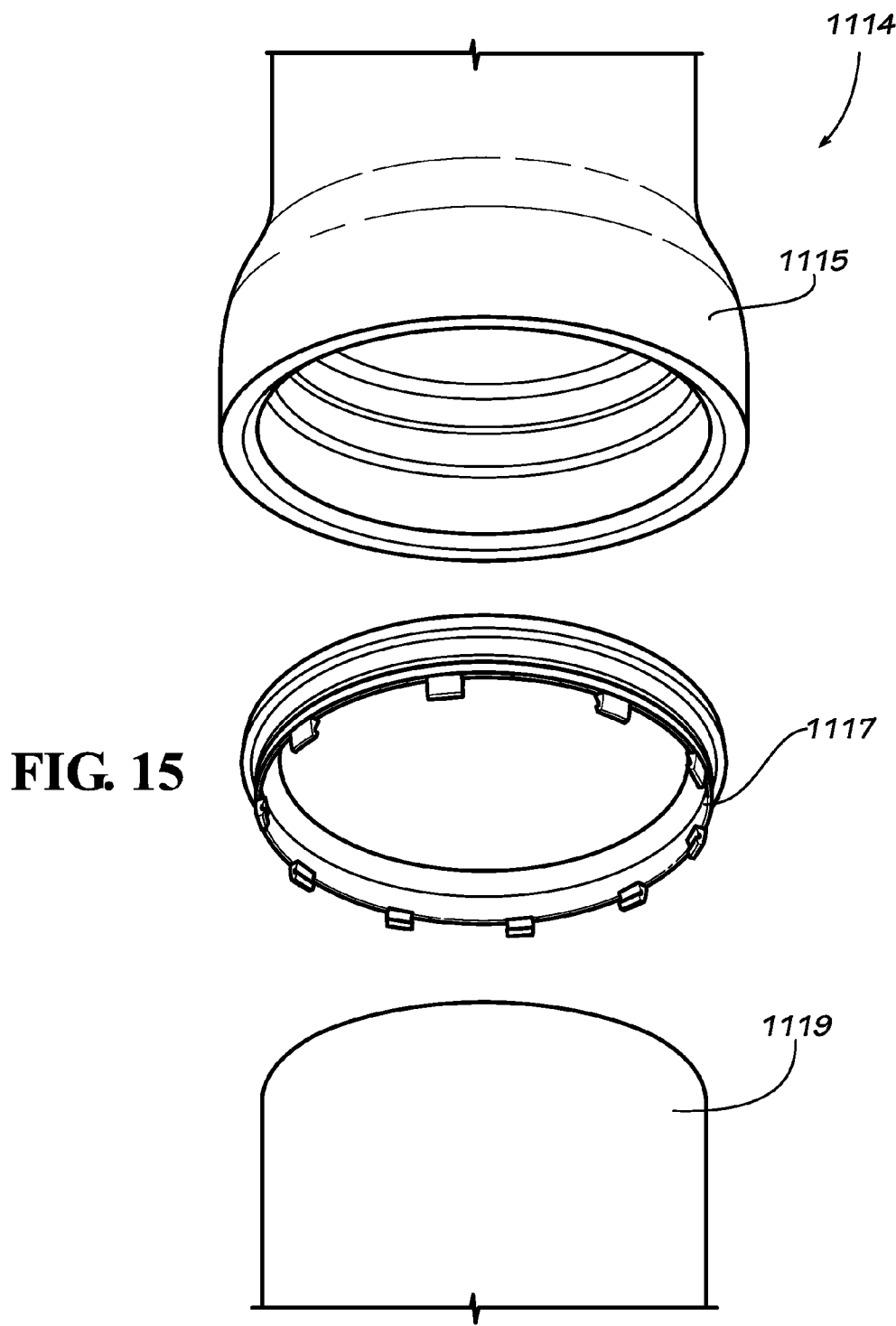
FIG. 15 is a blow-out view of the bell, spigot and gasket.

FIG. 15 illustrates the components of a system 1114 for sealing a spigot and a bell, including the bell 1115, the gasket 1117 and the spigot 1119. As stated with regard to the previous embodiment, the gasket 1117 is seated into the inner portion of the bell 1115 in the manner previously described.

Figure 16:
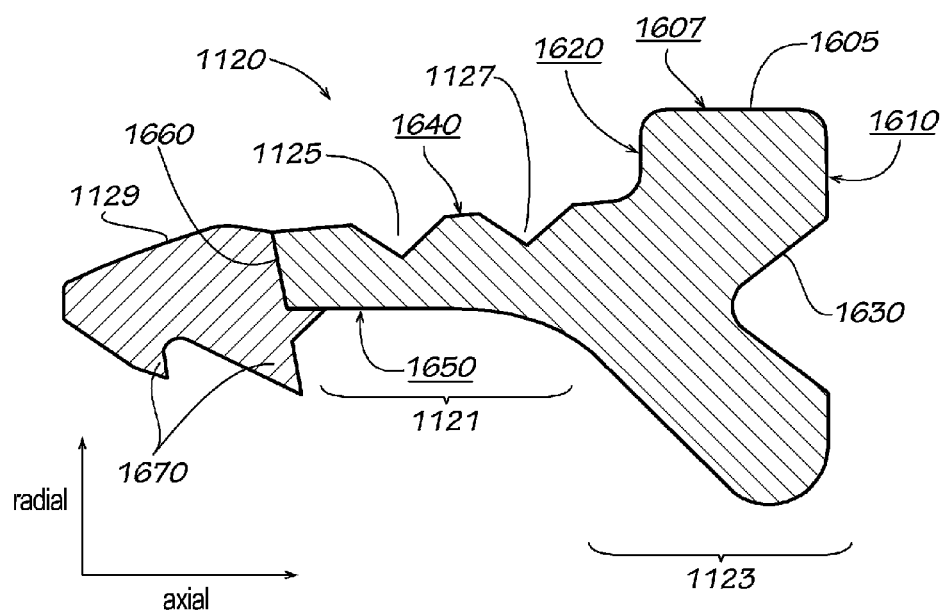
FIG. 16 is a cross-sectional view of an embodiment of the system of the disclosure.

Illustrated in FIG. 16 is a cross-section of an embodiment of a gasket 1120. A gasket 1120 has a first section 1121 and a second section 1123, the first section 1121 being axially adjacent to the second section 1123. The gasket 1120 also has a front edge 1660. The first section 1121 is between the front edge 1660 and the second section 1123. Illustrated in FIG. 16 are two grooves 1125 and 1127. Attached to the front of the gasket 1120 is a substantially rigid member 1129 attached to the front edge 1660. The substantially rigid member includes a pair of teeth 1670 extending radially inward, though any number of teeth may be present in various embodiments. The first section 1121 of the gasket 1120 includes an upper surface 1640 and an inner surface 1650. The two grooves 1125,1127 are defined in the upper surface 1640 and, in the current embodiment, are V-shaped. The upper surface 1640 faces radially outward and the inner surface 1650 faces radially inward. The second section 1123 defines a gasket heel 1605, the gasket heel 1605 defining a heel surface 1607, a first shoulder surface 1610, and a second shoulder surface 1620 distal from the first shoulder surface 1610. The second section also defines an annulus pocket 1630. In the current embodiment, the first should surface 1610 and the second shoulder surface 1620 extend radially inward from the heel surface 1607. The first shoulder surface 1610 extends from the heel surface 1607 towards the annulus pocket 1630, and the second shoulder surface 1620 extends from the heel surface 1607 towards the upper surface 1640. In the current embodiment, the first shoulder surface 1610 and the second shoulder surface 1620 are orthogonal to the heel surface 1607. The upper surface 1640 extends from the front edge 1660 to the second shoulder surface 1620, and the inner surface 1650 extends from the front edge 1660 to the second section 1123. The heel surface 1607 faces radially outward and is cylindrically-shaped. Further, in the current embodiment, the heel surface 1607 is radially outward from the upper surface 1607.

The purpose of the grooves 1125 and 1127 are to allow the first section 1121 to flex, thereby allowing the displacement of the front edge of the first section in an axial and radial direction when the spigot 1005 is inserted. This displacement allows the substantially rigid member 1129 to move along the inner surface of the bell 1010 (i.e. out of the way of the outer surface of the spigot 1005) so as to reduce the friction generated between the substantially rigid member 1129 and the spigot 1005. Other ways of enabling the incurvation of the first section 1121 of the gasket 1120 may be used. For example, the first section 1121 may be made of a more flexible material than the second section 1123. The first section 1121 and the second section 1123 may be separate pieces coupled together in a flexible manner. Alternately, the first section 1121 may be provided with holes in the interior of the first section 1121 as a means of inculcating the first section 1121.

The substantially rigid members 1129 transfer the forces generated by the friction of the insertion of the spigot 1005 to the first section 1121 of the gasket 1120. The substantially rigid members 1129 may be provided with geometry for gripping the outer surface of the spigot 1005, such as the teeth 1131 illustrated in FIG. 16. Other geometries for gripping the outer surface of the spigot may include, for example, rough surfaces, a plurality of raised protrusions and the like.

Other embodiments and uses will be apparent to those skilled in the art from consideration of the specification and practice disclosed herein. Ail references cited herein, including all publications, U.S. and foreign patents and patent applications, are specifically and entirely incorporated by reference. It is intended that the specification and examples be considered exemplary only with the true scope and spirit of the disclosure indicated by the following claims.

We claim:

1. An annular gasket comprising:
    an elastomeric member having a front edge, a first section and a second section;
        the first section defining an upper surface facing radially outward, an inner surface facing radially inward, and at least two grooves defined in the upper surface; and
        the second section axially adjacent the first section and defining an annulus pocket and a gasket heel, the gasket heel defining a heel surface, a first shoulder surface, and a second shoulder surface, the heel surface facing radially outward, the heel surface cylindrically-shaped and radially outward from the upper surface of the first section, the first shoulder surface extending radially inward from the heel surface towards the annulus pocket, and the second shoulder surface distal from the first shoulder surface and extending radially inward from the heel surface towards the upper surface;
        wherein the first section is between the front edge and the second section; and
    a plurality of substantially rigid member attached to the front edge, each substantially rigid member having at least one tooth extending radially inward.

2. The gasket of claim 1, wherein the front edge is axially displaceable upon insertion of a spigot.

3. The gasket of claim 2, wherein the first section is incurvated upon axial displacement of the front edge.

4. The gasket of claim 1, wherein the first shoulder surface and the second shoulder surface are orthogonal to the heel surface.

5. The gasket of claim 1, wherein the annulus pocket is defined in a back edge of the second section.

6. The gasket of claim 1, wherein the at least two grooves are V-shaped.

7. The gasket of claim 1, wherein the at least one tooth of each substantially rigid member is two teeth.

8. The gasket of claim 1, wherein the upper surface of the first section extends from the front edge to the second shoulder surface of the second section.

* * * * *